United States Patent [19]

Maeda et al.

[11] Patent Number: 4,575,206
[45] Date of Patent: Mar. 11, 1986

[54] FLAT CAMERA WITH A RETRACTABLE GRIP MEMBER

[75] Inventors: Keisuke Maeda, Sakai; Hiroshi Ueda, Nara, both of Japan

[73] Assignee: Minolta Camera Kabushiki Kaisha, Osaka, Japan

[21] Appl. No.: 530,143

[22] Filed: Sep. 7, 1983

[30] Foreign Application Priority Data

Sep. 10, 1982 [JP] Japan .......................... 57-138120[U]
Sep. 10, 1982 [JP] Japan .......................... 57-138121[U]

[51] Int. Cl.[4] ............................................ G03B 21/14
[52] U.S. Cl. ........................................ 354/82; 354/269
[58] Field of Search ................. 354/81, 82, 269, 121, 354/293, 220; 352/243

[56] References Cited

U.S. PATENT DOCUMENTS

| 1,879,949 | 9/1932 | Pinkosh ............................. 354/220 |
| 3,242,840 | 3/1966 | Kremp et al. ........................ 354/82 |
| 3,522,766 | 8/1970 | Wolbarst ........................... 354/82 X |
| 3,597,068 | 8/1971 | Masuyama et al. ............... 354/82 X |
| 4,451,130 | 5/1984 | Yan ...................................... 354/82 |

FOREIGN PATENT DOCUMENTS 1102872 10/1955 France ................................. 354/269

Primary Examiner—L. T. Hix
Assistant Examiner—Brian W. Brown
Attorney, Agent, or Firm—Wolder Gross & Yavner

[57] ABSTRACT

A disc film type camera is of thin rectangular parallelepiped shape with a vertically medially located objective lens proximate and side face and a grip handle member pivoted to the other side face, a short distance above its bottom, and swingable between a retracted position overlying and almost coextensive with the other side face and an extended position depending vertically from the camera, a camera self-supporting position in which the handle member extends horizontally rearwardly from the pivot axis and a camera handheld position in which the handle member is forwardly downwardly inclined 30° to the camera vertical. A recess and detent arrangement is provided for releasably locking the handle in its selected position. The handle member carries a hand strap engaging ring, a tripod screw socket coupling, and a remote cable control coupling electrically connected to the camera shutter release circuit. A convex framing mirror is centrally located on the camera front face and on the front face proximate the other side face are located a photoflash light device and a shutter release button proximate the front face top and bottom boarders respectively.

2 Claims, 10 Drawing Figures

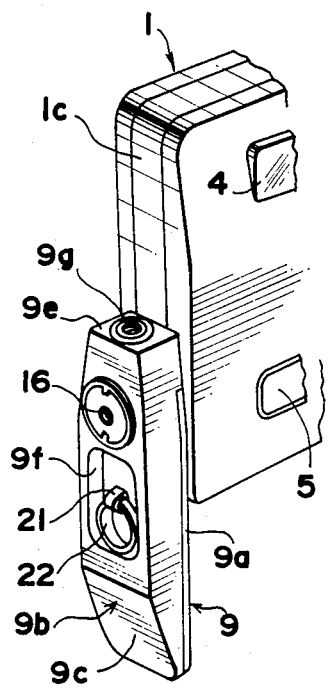
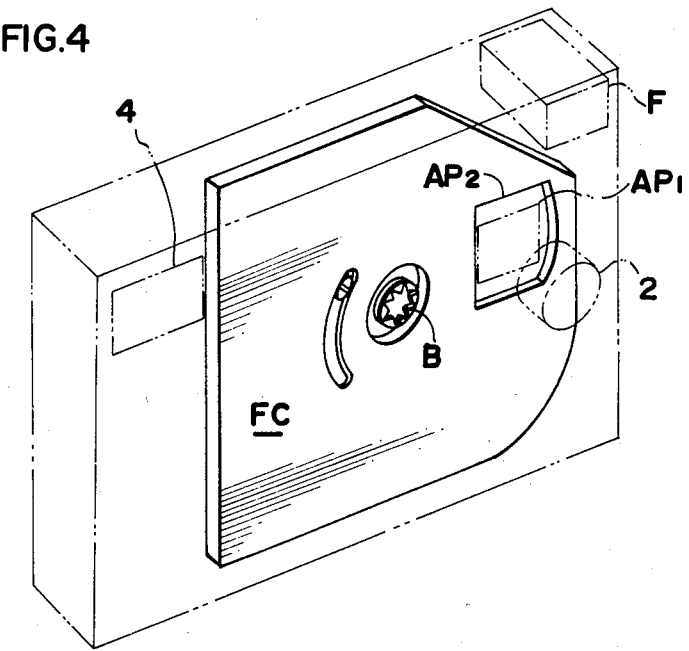

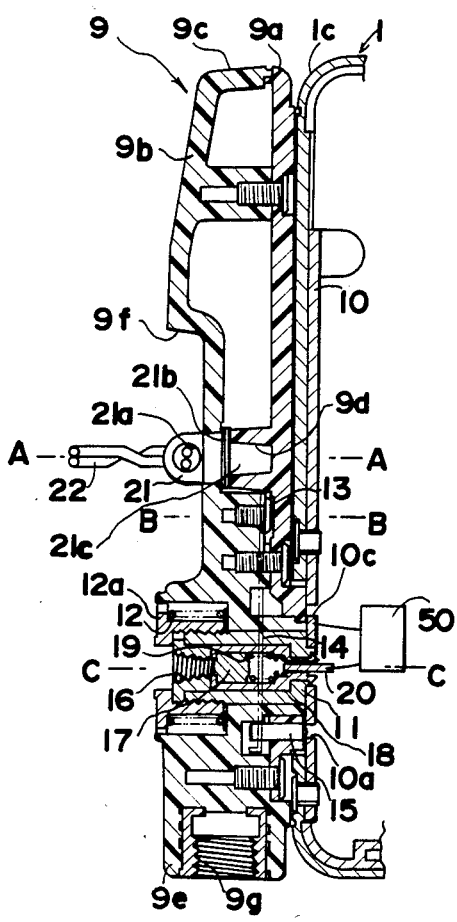
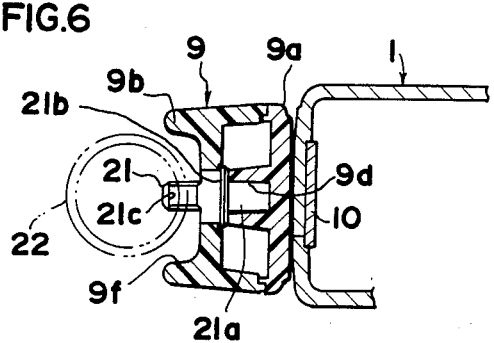
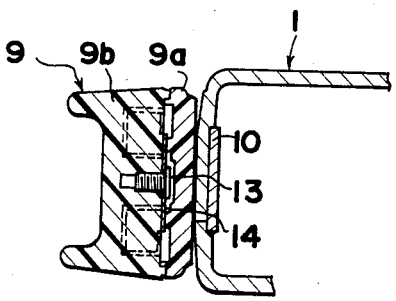
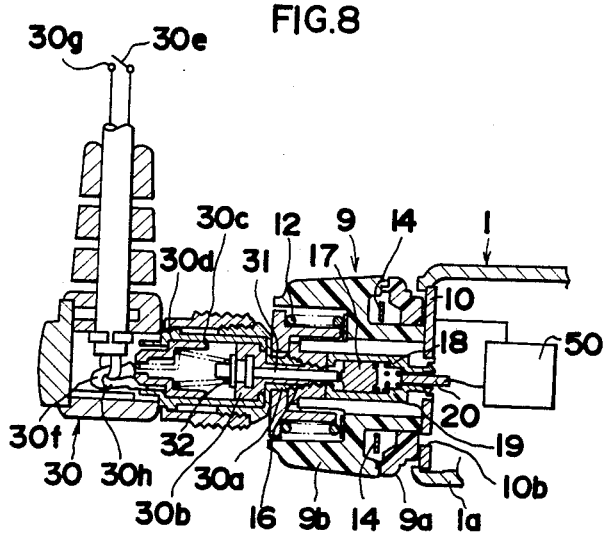
FIG.5
FIG.6
FIG.7
FIG.8

FLAT CAMERA WITH A RETRACTABLE GRIP MEMBER

BACKGROUND OF THE INVENTION

1. Field of the Invention

The present invention relates to an improved flat camera, such as of the disc film cartridge type, which is generally parallel-piped shape and flat and thin in the transverse direction i.e. in the direction of the camera optical axis.

2. Background of the Invention

An example of a flat camera of the above nature is one which employs a disc film cartridge as described in U.S. Pat. No. 4,309,096. The disc film cartridge is provided with a central hub which may be coupled with a rotational driving system, and encloses therein a film member with an exposure region where fifteen rectangular exposure frames are to be formed circularly around the central hub, with each frame having its shorter sides disposed in the circumferential direction of the disc film. Such a disc film cartridge facilitates the construction of a camera in a flat shape because of the thinness of the cartridge itself. However, as to the arrangement of the components of the camera employing such a disc film cartridge, the exposure aperture must be formed at a location remote from the center of the loaded film cartridge, with the shorter sides of the exposure aperture being vertically oriented. Hence, the camera objective lens, being in alignment with the exposure aperture, must also be disposed in the camera housing proximate one side thereof and at a generally medial position in the vertical direction. As regards the light-emitting portion of a photoflash device provided in the camera housing, the light-emitting portion should preferably be located as remote as possible from the objective lens for the purpose of avoiding the redeye phenomenon. Additionally, it is preferable that the photoflash light-emitting portion is located at the upper portion near the other side of the camera housing because a light-emitting portion located lower than the camera objective lens will cause unnatural shadows on the objects being photographed.

When the camera user takes a picture with the camera provided with the objective lens and the light-emitting portion of the flash device arranged as described above, the user should normally support the camera with one hand touching the front and rear surfaces of the lower portion of the camera housing close to the objective lens located on one side and with the other hand touching the front and rear surfaces of the lower portion of the camera housing close to the opposite other side. Supported in that way, the camera is unstable and it sometimes occurs that some fingers of the user's hand partially covers the light-emitting portion of the flash device, preventing proper illumination.

A known flat camera of the type described above is provided with a cover member which covers the front of the camera when not in use and which is adapted to serve as a grip for holding the camera when in use. Such a cover member not only increases the camera thickness when in the covered condition, resulting in inconvenience in the carrying of the camera, but it also renders the camera unsuitable for holding because the cover member is formed at its interior surface with recesses and projections complementary with the configuration of the camera front and the user's fingers encounter or touch the recesses and projections resulting in great inconvenience in the holding of the camera.

SUMMARY OF THE INVENTION

An object of the present invention is to provide a compact flat-shaped camera which is free from the above disadvantages, suitable for hand carrying, placing in a pocket and easily held.

Another object of the present invention is to provide a compact, flat-shaped camera on which a tripod screw receiver is located at a reasonable and convenient position to enable photography with the camera being mounted on a tripod or a horizontally extending supporting rod, but without making the camera bulky.

A camera, according to the present invention, comprises a housing of a parallel-piped shape which is flat and thin in the direction of the camera optical axis, an objective lens substantially vertically medially located in the housing proximate a first side plane of the housing, and a light-emitting portion of an electronic flash device located on the front plane of the camera housing at an upper position proximate the housing second side plane laterally opposite from the first side plane. On the second side plane, a grip member is mounted and movable between a retracted or folded position and an extended holding position adapted for holding the camera. The grip member extends along and is substantially coextensive with the second side plane of the camera housing in its retracted or rest position, so that the grip member does not make the camera cumbersome when the camera is contained in a pocket or a bag. At the holding position, a portion of the grip member extends downward from the second side plane of the camera housing so as to be held by the hand. While photographing, the user may support the camera by holding the extending portion of the grip member, whereby not only can the camera be stably held, but also the possibility is eliminated of the light-emitting device of the built-in flash unit being obstructed by a user's finger. In addition, a holding means is provided for fixedly or semi-fixedly positioning the grip member at its holding position.

On the camera, an operation member for camera release or operation initiation may be provided on the camera front face at a position close to the second side plane and the bottom edge of the camera housing. In that case, the operation member can be easily operated by the forefinger of the hand holding the grip member.

The grip member may be rotatably supported on the second side plane of the camera housing such that the grip member is rotated to and set at a desired stand position so that the camera may be self-supporting with the cooperation of one end of the grip member and the bottom edge of the camera housing, whereby pictures can be taken with the camera standing on a table. Thus, the camera becomes more convenient.

Further, the grip member may be provided with a hand strap holder. If the hand strap holder is located such that when the grip member is at its retracted or folded position, the hand strap holder is on an extension of the perpendicular from the center of the gravity of the camera, in the plane generally parallel with the shorter side of the exposure aperture, vertically oriented pictures can be taken with self-timer with the camera being suspended by a hand strap attached to the strap holder and hung from a nail, an extending branch, or other protrusion.

Additionally, a tripod female screw may be formed at one end of the grip member to receive the male screw of a tripod or a horizontal supporting rod, enabling the mounting of the camera on the tripod or the rod for various photographing operations. As the grip member is mounted on the second side plane, the rod does not interfere with the photographic view when the rod is extended generally in the same direction as the camera optical axis.

It is to be understood that a member in which the tripod female screw is formed must have some thickness. Consequently, the camera will be made bulky if the female screw is formed in the camera. However, if the female screw is formed in the grip, the camera bulk is not increased.

The above and other objects and features of the present invention will become more apparent from the following description of a preferred embodiment of the present invention and the accompanying drawings.

BRIEF DESCRIPTION OF THE DRAWINGS

FIGS. 1 through 10 show a camera according to an embodiment of the present invention wherein:

FIG. 1 is a general perspective view of the camera with the grip member at its retracted rest or folded position;

FIG. 2 is a view similar to FIG. 1, but with the grip member show in its camera standing position;

FIG. 3 is a fragmentary perspective view of the camera with the grip at its first extended holding position;

FIG. 4 is a perspective view of a disc film cartridge loaded in the camera;

FIG. 5 is a cross-sectional view of the grip member taken along a transversely medial vertical plane thereof FIG. 6 is a horizontal cross-sectional view taken along line A—A in FIG. 5;

FIG. 7 is a horizontal cross-sectional view taken along line B—B in FIG. 5;

FIG. 8 is a horizontal cross-sectional view taken along line C—C in FIG. 5;

FIG. 9 is a fragmentary elevational plan view of a base plate provided on the second side plane of the camera housing for supporting the grip member; and FIG. 10 is a perspective illustration showing how the camera is supported for photography with a horizontal supporting rod.

DESCRIPTION OF A PREFERRED EMBODIMENT

Figure 1:
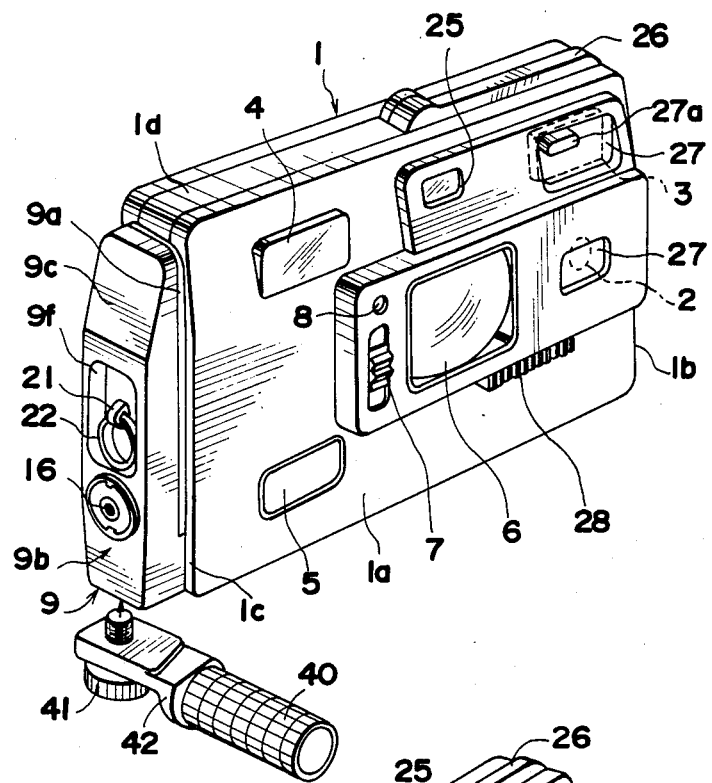
Figure 2:
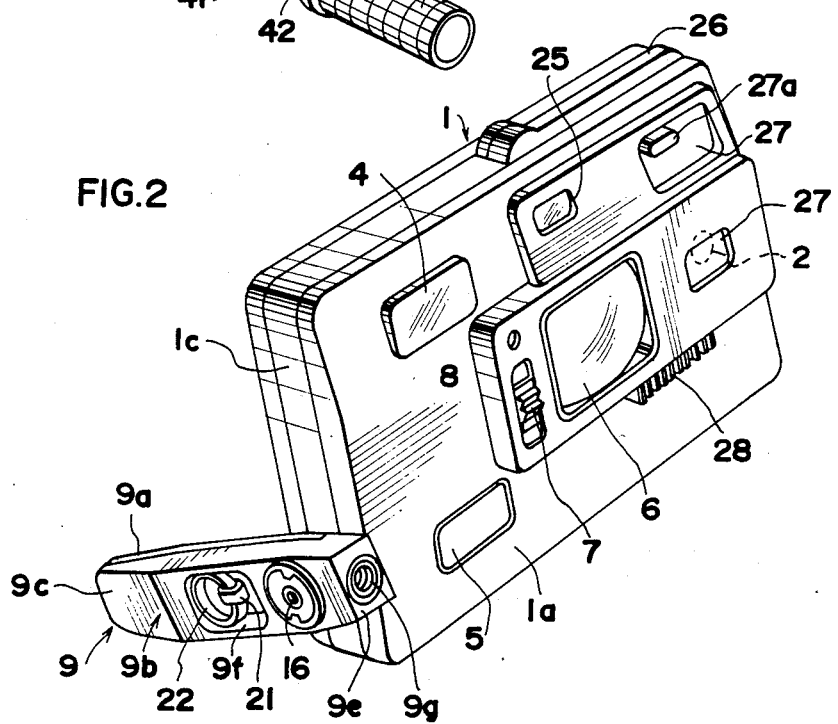

The embodiment shown in FIGS. 1 through 9 is the one wherein the present invention is applied to a camera for use with a disc film cartridge disclosed in the aforementioned U.S. Pat. No. 4,309,096. As shown in FIGS. 1 and 2, camera housing 1 includes front face or plane 1a, first and second side faces or planes 1b and 1c, a top face or plane 1d and bottom and back faces or planes not shown in the Figures, and has a substantially rectangular parallelepiped shape, thin and flat in the transverse direction. On the front plane of housing 1, an objective lens 2 is located close to first side plane 1b, generally at the center with respect to the vertical direction. A light-emitting portion 4 of a built-in electronic flash device covered by a flash window-panel and a release button 5 as the operation member for the camera release or operation initiation are located close to second side plane 1c at the upper and lower positions, respectively. A convex mirror 6 for framing observation is provided adjacent to the objective lens and at the center of the camera front surface with respect to the vertical and horizontal directions. Upon photography, the user, who stands in front of the camera, can confirm the extent of the scene to be photographed or frame the scene by observing convex mirror 6 (see FIG. 10). Besides the mirror, are provided a mode selector member 7 and self-timer indicator 8. Mode selector 7 can be manually operated for switching the camera between a normal photography mode and a self-timer photography mode, but its detail will not be described here. Self-timer indicator 8 comprises a light-emitting diode which, as is known in the art, starts to blink at a given frequency, with the start of time measurement for self-timer photography, and blinks at a higher frequency after a lapse of a given time and is deenergized upon the camera shutter bing released.

As shown in FIG. 4, a rectangular aperture or frame AP1 is formed at the rear of objective lens 2 and within housing 1, with the shorter sides being positioned vertically. When a film cartridge FC is correctly loaded in housing 1, its exposure aperture AP2 is brought into alignment with camera exposure aperture AP1. The disc film enclosed within film cartridge FC is provided with a central hub with an engaging or coupling portion B may be operatively coupled with a not shown driving mechanism in the camera. The disc film is also provided with a light sensitive film member on which fifteen image or picture frames are to be produced with the shorter sides of each frame positioned in the circular direction while the film member is incrementally rotated and exposed through exposure aperture AP2.

Exposure aperture AP1 is formed in a rectangular shape corresponding to the shape of the frames. Film cartridge FC is cut out at the corner above exposure aperture AP2 so as not to interfere with the camera viewfinder optical system F, when the film cartridge is properly loaded in the camera. A viewfinder window 3 is formed in the front surface of housing 1 above objective lens 2.

A light receiving window 25 is medially located in the upper border of the camera front face for admitting the object light to a photoelectric element for exposure control. A lock release member 26 on the camera top face is for releasing the locking of the cover of the camera cartridge chamber. A cover member 27 is slidable to cover and uncover objective lens 2 and viewfinder window 3 has accessible thereon a projection 27a for its manipulation.

Figure 9:
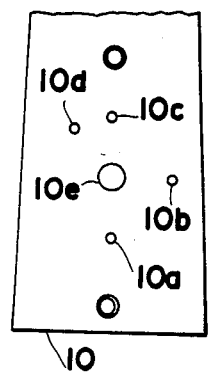

A grip member 9 molded of synthetic resin material is provided on second side plane 1c of housing 1. As shown in FIG. 5, grip member 9 is composed of an inner member 9a and an outer member 9b, which are interconnected by screws. Grip member 9 is pivotally supported by a stud 11, which is fixed by calking on base plate 10, which in turn, is fixed by screws on side plane 1c of housing 1. A coil spring 12 provided around stud 11 serves to urge grip member 9 against base plate 10. As shown in FIGS. 5 and 7, a leaf spring 14, fixed by a screw 13 at its end to the inner surface of outer member 9b, is provided at its other end with a click pin 15, having a head which selectively engages click openings or holes 10a through 10d, formed on base plate 10, as shown in FIG. 9. Opening 10a is located directly below calk hole 10e for stud 11 such that grip member 9 assumes its retracted rest or folded position substantially coextensive with and substantially or entirely overlying side plane 1c of housing 1 when the head of click pin 15 engages opening 10a (see FIGS. 1 and 5). Opening 10b is formed at a position angularly spaced by 90 degrees in the counterclockwise direction, as viewed in FIG. 9, around hole 10e from opening 10a such that when the head of click pin 15 engages opening 10b, grip member 9 is releasably locked or fixed at its stand position, with its outer end 9c extending rearwards at a right angle to the plane of the rear surface of housing 1 (FIG. 2), thereby enabling the housing 1 to stand by itself on a table by the cooperation of end 9c and the bottom edge of housing 1 Further, referring to FIG. 9, opening 10c is located at a position angularly spaced by 90 degrees in the counterclockwise direction around hole 10e from opening 10b, i.e., directly above hole 10e and opening 10a, such that when the head of click pin 15 engages opening 10c, grip member 9 is fixed at the first fully extended holding position with its one end 9c depending from side plane 1c of housing (FIG. 3). The user may grasp the extending end 9c of grip member 9 and support the camera, i.e., housing 9 for picture taking. Further, opening 10d is formed at a position angularly spaced by 30 degrees in the counterclockwise direction around hole 10e from opening 10c such that when the head of click pin 15 engages opening 10d, grip member 9 is releasably fixed at the second holding position, with its one end 9c extending obliquely and downwardly from side plane 1c of the housing whereby the housing assumes an upstanding position when end 9c is held in the user's hand. This is because grip member 9 assumes an angular position to be grasped with the user's wrist stretched naturally. Thus, when the head of click pin 15 engages any one of openings 10a through 10d, grip member 9 is releasably fixed witn respect to housing 1. Additionally, grip 9 may be positioned where the head of click pin 15 abuts against the surface of base plate 10 between any adjacent two of openings 10a through 10d. In that case, grip member 9 is held in a semifixed condition relative to housing 1 under the action of leaf spring 14. Thus, leaf spring 14, click pin 15 and base plate with openings 10a through 10d, together form a holding means for fixedly and/or semi-fixedly holding grip member 9 relative to housing 1.

As shown in FIGS. 5 and 8, an electrically insulated cylinder member or sleeve 18 is axially disposed in stud 11 and held therein through cable socket female screw member 16 by retaining member 12a threaded into stud 11. Additionally, within cylinder member 18 is slidably fitted a contact member 17 to move axially within a given distance and a coil spring 19 which outwardly biases contact member 17. One end of coil spring 19 abuts contact pin 20 which fixedly engages member 18 and which is electrically connected to a terminal of a camera actuating or releasing circuit 50 within housing 1. It should be understood that base plate 10, stud 11, cable socket female screw member 16, contact member 17, coil spring 19 and contact pin 20, are all made of electrically conductive material, and that the other terminal of camera actuating circuit 50 is connected to base plate 10.

As shown in FIG. 8, grip member 9 is adapted to receive the output of active end of a cable release member 30. Cable release member 30 comprises cable socket male screw member 30a, threadable into cable socket female member 16 an electrically insulating member 30b and an electrically conductive cylinder member 30c, both fixed within male screw member 30a, and an electrically insulating member 30d fixedly fitted within cylinder member 30c. A contact pin 31, extending through insulating member 30b, abuts against one end of a coil spring 32 and is biased thereby to project from insulating member 30b and cable socket male member 30a. The other end of the coil spring is soldered to cord 30f, which is connected with the movable contact 30e of a release switch S1. Cord 30h, connected with fixed contact 30g of switch S1, is soldered to cylinder member 30c. Switch S1 is adapted to be closed by depressing the release button (not shown) of cable release member 30.

Further, as shown in FIGS. 5 and 6, grip member 9 is equipped with a suspension ring holder 21, which comprises a projecting portion having an opening 21a, a central rib portion 21b of large diameter, and a tapered projecting portion 21c. Ring holder 21 is rotatably supported by grip member 9 with projecting portion 21c engaging a socket or opening 9d formed on the outer side of inner member 9a, and central rib portion 21b engaging the inner side of outer member 9b. Suspension ring 22 passes through opening 21a of the projecting portion of suspension ring holder 21 and can receive a hand strap. The portion 9f of outer member 9b surrounding suspension ring holder 21 is formed with a rectangular recess into which suspension ring 22 may be folded and received, as shown in FIGS. 1 through 3. Suspension ring holder 21 is located on an extension of a perpendicular from the center of gravity of the whole camera (including grip member 9), in a plane which is normal to the plane of the disc film in film cartridge FC loaded in camera housing, and which is generally parallel with the shorter side of exposure aperture AP1. Accordingly, if a picture is taken under the control of the self-timer, with the camera being hung from a branch or the like, through the hand strap, the picture taken is of a vertical composition, i.e. with the longer sides of the picture frame being vertical. Additionally, if the camera is hung from the hand with the hand strap engaging the user's wrist, the camera is carried in a vertically suspended position with its side plane being at the top. This is a convenient manner of carrying the camera. Further, as suspension ring holder 21 is rotatably held by grip member 9, the hand strap does not twist even when grip member 9 is rotated relative to housing 1 with the hand strap being placed around the user's hand or wrist. Therefore, grip member 9 can be smoothly rotated from the wrist position to the first and second holding positions.

On the bottom 9e of grip member 9, proximate stud 11, there is formed a female screw 9g to connect a tripod or a supporting rod 40 to grip member 9. As the use of the tripod in association with a camera is well-known in the art, and it is not necessary to explain it further. Supporting rod 40 comprises a telescopic extendable rod member which is provided at its inner end with a tripod screw seat 42, and can be connected with grip member 9 by threading a tripod screw 41 into female screw 9g.

With the construction described above, when grip member 9 is manipulated until the head portion of click pin 15 engages click opening 10a, the whole of grip 9 overlies the side plane 1c of the camera housing. Accordingly, the camera, as a whole, remains in a generally flat and thin parallelepiped shape, with no large projections. Thus, grip member 9 causes no inconvenience when the camera provided with the folded grip member 9 is put into a pocket or a bag.

Then, when grip member 9 is turned counterclockwise 90° about the stud from its folded or retracted rest position described above, until the head of click pin 15 engages opening 10b with the grip reaching a rearwardly projecting stand position, the camera can be stood in a self-supporting position on a table. At this time, the camera assumes a slightly rearwardly upwardly inclined orientation, suitable for self-timer photography set by switching member 7 or for photography with the cable release member 30 being used.

When grip member 9 is turned or rotated counter-clockwise by a further 90° about stud 11, the head of click pin 15 engages click opening 10c to releasably retain grip member 9 in the first holding position. As one end 9c of grip member 9 is positioned directly downwards from the side plane 1c of housing 1 at that position of the grip member, the camera can be supoorted with the extended portion 9c being held by hand. Under this condition, as camera release button 5 is located at a position close to both side plane 1c and the bottom edge of the camera, release button 5 can easily be depressed by the forefinger of the right hand holding end 9c of grip 9. Upon depression of the button, release circuit 50 is actuated to initiate a camera photographing operation. As end 9c of grip member 9 is remote from flash light emitting portion 4, it is unlikely that any finger of the right hand will cover or interfere with this light emitting portion.

When grip member 9 is turned to the second holding position, where the head of click pin 15 engages click opening 10d, camera housing 1 naturally assumes an upstanding posture with the grip being held by the right hand. In this case, it is also unlikely that any finger of the right hand will cover the flash light emitting portion during photography. When grip 9 is set to the standing position, the camera may be released by cable release member 30 connected to grip member 9. As shown in FIG. 8, when cable socket male screw member 30a of cable release member 30 is threaded into cable socket male member 36 of grip member 9, contact pin 31 makes good contact with contact member 17 with suitable contact pressure, and movable contact of switch S1 is connected through cord 30f, coil spring 32, contact pin 31, contact member 17, coil spring 19 and contact pin 20 to one terminal of release circuit 50. Simultaneously, another terminal of release circuit 50 is electrically connected through base plate 10, stud 11, cable socket male screw member 30a, cylinder member 30c and cord 30h, with fixed contact 30g. Thus the closure of switch S1 on release member 30 actuates release circuit 50 to initiate the camera photographing operation.

Figure 10:
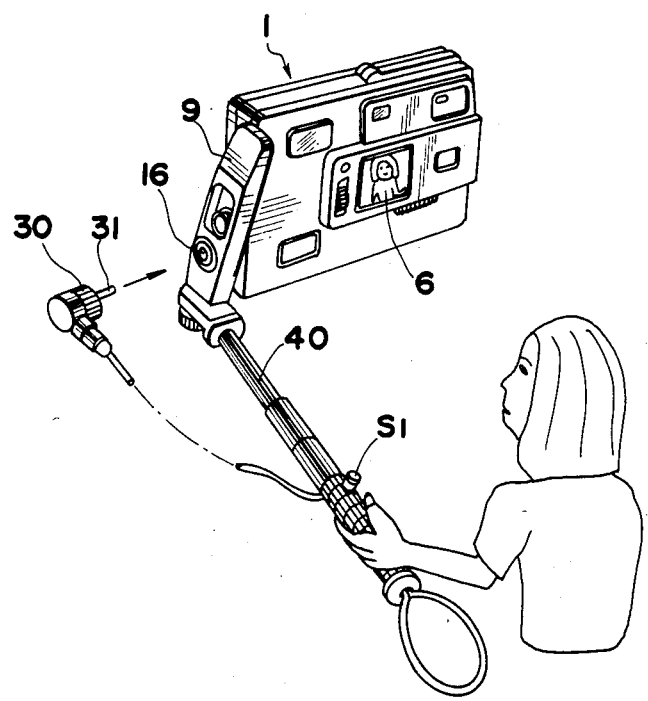

FIG. 10 shows how self pictures of the user are taken with the camera supported by telescopic supporting rod 40 attached to grip member 9 and cable release member 30 also being connected to grip member 9. In this case, switch S1 and its operating button are attached to the handle portion of grip member 40, which is telescopically extendable. In FIG. 10, housing 1 is shown as slightly rearwardly upwardly inclined from the perpendicular position relative to grip member 9, but grip member 9 associated with supporting rod 40, may be set at any rotational oosition about stud 11 according to the user's needs. Cable release member 30 may be used when a tripod is connected to grip member 9 to support the camera housing by the tripod. When the user takes self-pictures in the manner shown in FIG. 10, he or she can observe in convex framing mirror 6, prior to the camera release operation, the scene to be photographed, and how he or she is positioned in the scene. In this case, as grip member 9 is provided on the second side plane 1c remote from objective lens 2, no portion of supporting rod 40 is in the photographic field or appears in the picture. In the case supporting rod 40 or a tripod is connected to grip member 9, pictures may be taken by actuating the self-timer device in place of using cable release member 30.

Although an illustrated preferred embodiment has been described, it should be understood that the embodiment is shown only for illustrative purposes and that the present invention is not restricted to the specifically described embodiment. For example, grip member 9 may be mounted to slide longitudinally on side plane 1c between a camera retracted overlying rest position and an extended first holding position, in place of being rotatably mounted on the plane. In that case, grip member 9 may be arranged to rotate only at or about its retracted rest position, enabling the setting of grip member 9 to the second stand position or the second holding position. Further, various mechanisms or constructions may be employed for retaining grip member 9 fixedly or semi-fixedly relative to housing 1, in place of the above described structure, including leaf spring 14, click pin 15 and base plate 10 with openings in which click pin 15 is engageable.

What is claimed is:

1. A thin flat camera comprising:
    a housing of parallelepiped shape and flat and thin with respect to the transverse direction, said housing including a front plane, opposite first and second side planes, a top plane, a bottom plane and a rear plane;
    an objective lens vertically medially located in said housing front plane proximate said housing first side plane;
    an electronic flash device having a light emitting portion located on said housing front plane at an upper position proximate said housing second side plane;
    a stud mounted on said housing second side plane at a position close to said housing bottom plane;
    a grip member rotatably supported by said stud on said housing second side plane at a lower position close to said housing bottom plane and being rotatable about an axis normal to said housing second side plane between a plurality of angular positions including a retracted position where it extends along and is substantially coextensive in length with said second side plane, an extended position where a portion thereof extends downward from said second side plane to be hand holdable and a self-support position between said extended and retracted positions, where said camera is self-supporting with the cooperation of one end of said grip member and a bottom edge of said housing;
    releasable locking means for releasably retaining said grip member in its extended and self-supporting positions;
    a camera release circuit for initiating a camera operation;
    a cable release member connectable to said grip member; and
    means provided on said grip member for electrically connecting said cable release member to said camera release circuit.

2. A flat thin camera as defined in claim 1, wherein said cable release member includes a manual switch and a contact member electrically connected to said manual switch and biased to project from said cable release member, and said electrically connecting means includes a contact member provided in said stud to contact said contact member of said cable release member when the latter is connected to said grip member.

* * * * *